(12) United States Patent
Adachi et al.

(10) Patent No.: US 11,733,202 B2
(45) Date of Patent: Aug. 22, 2023

(54) GAS SENSOR, ELEMENT SEALING BODY OF GAS SENSOR, TUBULAR BODY, AND ASSEMBLY METHOD OF GAS SENSOR

(71) Applicant: NGK INSULATORS, LTD., Nagoya (JP)

(72) Inventors: Hiroki Adachi, Nagoya (JP); Yuka Wada, Niwa-gun (JP)

(73) Assignee: NGK INSULATORS, LTD., Nagoya (JP)

( * ) Notice: Subject to any disclaimer, the term of this patent is extended or adjusted under 35 U.S.C. 154(b) by 79 days.

(21) Appl. No.: 17/207,971

(22) Filed: Mar. 22, 2021

(65) Prior Publication Data

US 2021/0302360 A1  Sep. 30, 2021

(30) Foreign Application Priority Data

Mar. 31, 2020  (JP) ................. 2020-062503

(51) Int. Cl.
*G01N 27/407* (2006.01)
*G01M 15/10* (2006.01)

(52) U.S. Cl.
CPC ...... *G01N 27/4078* (2013.01); *G01M 15/102* (2013.01); *G01N 27/407* (2013.01); *G01N 27/4073* (2013.01)

(58) Field of Classification Search
CPC ............. G01N 27/4078; G01N 27/407; G01N 27/4073; G01N 33/0009; G01M 15/102
See application file for complete search history.

(56) References Cited

U.S. PATENT DOCUMENTS 9,588,078 B2 3/2017 Adachi et al.
2002/0003088 A1* 1/2002 Ozawa ............... G01N 27/4077
204/424

(Continued)

FOREIGN PATENT DOCUMENTS

EP 3093655 A1 11/2016
JP 2016-173360 A 9/2016
JP 6317145 B2 4/2018

OTHER PUBLICATIONS

Misumi, Technical data: Surface roughness JIS B 0601 (1994), from https://us.misumi-ec.com/pdf/tech/mech/US2010_fa_p3541_3542.pdf (Year: 1994).*

*Primary Examiner* — Joshua L Allen
*Assistant Examiner* — Shizhi Qian
(74) *Attorney, Agent, or Firm* — Mattingly & Malur, PC

(57) ABSTRACT

A gas sensor includes: a metal tubular body including a through hole allowing a sensor element to penetrate in an axial direction; and a powder compact being filled between an inner surface of the tubular body constituting the through hole and the sensor element, and sealing between both end portion sides of the sensor element. At least a range of a through hole inner surface to come into contact with the powder compact filled between the inner surface and the sensor element is a stripe-like recessed and projecting region in which projecting portions and recessed portions are alternately arranged in the axial direction and those portions extend along an inner circumferential direction of the tubular body. An interval between the projecting portions in the axial direction is 50 μm to 150 μm. The following expressions are satisfied, 0.3 μm≤Rz1≤10 μm, and Rz1/Rz2≥2.0.

9 Claims, 5 Drawing Sheets

(56) References Cited

U.S. PATENT DOCUMENTS

| | | | | |
|---|---|---|---|---|
| 2003/0116435 A1* | 6/2003 | Satou | ............... | G01N 27/4077 |
| | | | | 204/424 |
| 2016/0370312 A1* | 12/2016 | Adachi | ............... | G01N 27/407 |
| 2017/0276638 A1* | 9/2017 | Isaka | ............... | G01N 27/4067 |
| 2018/0281331 A1* | 10/2018 | Isaka | ............... | G01N 27/4078 |

\* cited by examiner

GAS SENSOR, ELEMENT SEALING BODY OF GAS SENSOR, TUBULAR BODY, AND ASSEMBLY METHOD OF GAS SENSOR

CROSS-REFERENCE TO RELATED APPLICATION

The present application claims priority from Japanese application JP2020-062503, filed on Mar. 31, 2020, the contents of which is hereby incorporated by reference into this application.

BACKGROUND OF THE INVENTION

Field of the Invention

The present invention relates to fixing and sealing of a sensor element in a gas sensor, and more particular to a configuration of a tubular body used therefor.

Description of the Background Art

As a device that measures concentration of a predetermined gas component in a measurement gas such as a combustion gas and an exhaust gas in an internal combustion engine such as an engine of a car, a gas sensor in which a sensor element is formed using oxygen-ion conductive solid electrolyte ceramics such as zirconia ($ZrO_2$) has hitherto been publicly known.

The gas sensor usually has the following configuration: on the inside (in a hollow part) of a tubular body that includes a housing and an inner tube both being made of metal and being integral with each other through welding, an elongated plate-like sensor element (detection element) made of ceramics is fixed by a plurality of ceramics supporters being insulators made of ceramics and a powder compact made of ceramics such as talc being filled between these ceramics supporters, and both end portions of the element are airtightly sealed by the powder compact. A method and an apparatus capable of preferably assembling such a gas sensor have already been publicly known (for example, see Japanese Patent Application Laid-Open No. 2016-173360).

Further, an aspect of enhancing air tightness performance between the sensor element and the tubular body by setting arithmetic average roughness Ra of a part of an inner peripheral surface of the tubular body to come into contact with at least the powder compact to 0.5 μm to 5 μm has already been publicly known as well (for example, see Japanese Patent No. 6317145).

Note that Japanese Patent No. 6317145 provides description that a gas sensor (hereinafter a reduced length product), whose length is reduced than a gas sensor (of related art) (hereinafter a product of the related art) disclosed in Japanese Patent Application Laid-Open No. 2016-173360, can also produce similar effects.

More specifically, in the reduced length product disclosed in Japanese Patent No. 6317145, in order to implement reduction of length from the product of the related art, one ceramics supporter disposed between two powder compacts is omitted and the powder compact is disposed in one continuous range. Further, instead of an aspect of performing crimping from the side, an aspect of bending a thin crimp part provided at an upper end portion of the tubular body to fix the sensor element and others inside the tubular body is adopted as well. The length of the crimp part in the axial direction is reduced smaller than the length of the inner tube in the axial direction.

As a specific aspect for implementing the arithmetic average roughness Ra of 0.5 μm to 5 μm at the part of the inner peripheral surface of the tubular body to come into contact with at least the powder compact, Japanese Patent No. 6317145 discloses an aspect of forming a helical groove through machining on the inner peripheral surface of the tubular body produced through forging. Note that there is also a reference that the arithmetic average roughness Ra described above may be implemented by forming a groove having a shape other than the helical shape.

Meanwhile, in the working example of Japanese Patent No. 6317145, there is an evaluation carried out on the impact on air tightness performance made by a difference of the arithmetic average roughness R and sealing loads when different sealing loads, from 800 kgf to 2000 kgf, for implementing sealing with the powder compact are used in a process of obtaining a secondary assembly product of a gas sensor intended for an airtightness test. The results lead to a confirmation that there is a tendency that more satisfactory air tightness performance is obtained as the sealing load is larger, regardless of the arithmetic average roughness R.

However, a larger sealing load at the time of compression of the powder compact leads to application of an excessive load on the sensor element, which raises the risks of causing damage. From the perspective of avoiding such risks, it is desirable that air tightness performance be secured with as low sealing load as possible.

SUMMARY

The present invention relates to fixing and sealing of a sensor element in a gas sensor, and is particularly intended for a configuration of a tubular body used therefor.

According to the present invention, a gas sensor includes: a sensor element; a tubular body including a through hole allowing the sensor element to penetrate an inside of the tubular body in an axial direction, the tubular body being made of metal; and a powder compact being filled between an inner surface of the tubular body constituting the through hole and the sensor element, and sealing between a first end portion side and a second end portion side of the sensor element. At least a range of the inner surface of the tubular body to come into contact with the powder compact is a stripe-like recessed and projecting region in which projecting portions and recessed portions are alternately arranged in the axial direction and the projecting portions and the recessed portions extend along an inner circumferential direction of the tubular body. An interval between the projecting portions in the axial direction is 50 μm or more and 150 μm or less. A first maximum height Rz1 being a maximum height in the axial direction and a second maximum height Rz2 being a maximum height in the inner circumferential direction of the stripe-like recessed and projecting region satisfy the following expressions, 0.3 μm≤Rz1≤10 μm, and Rz1/Rz2≥2.0.

With this configuration, even when sealing between both end portions of the sensor element in the gas sensor is performed with a sealing load lower than that of the related art, satisfactory airtightness can be secured. Further, the risks of shift of the position or the posture of the sensor element at the time of sealing and damage of the sensor element can be reduced.

Therefore, an object of the present invention is to provide a gas sensor capable of achieving air tightness performance that is equivalent to or higher than that of related art even when sealing is performed with a sealing load lower than that of the related art.

These and other objects, features, aspects and advantages of the present disclosure will become more apparent from the following detailed description of the present disclosure when taken in conjunction with the accompanying drawings.

DESCRIPTION OF THE PREFERRED EMBODIMENTS

<Configuration of Gas Sensor>

Figure 1:
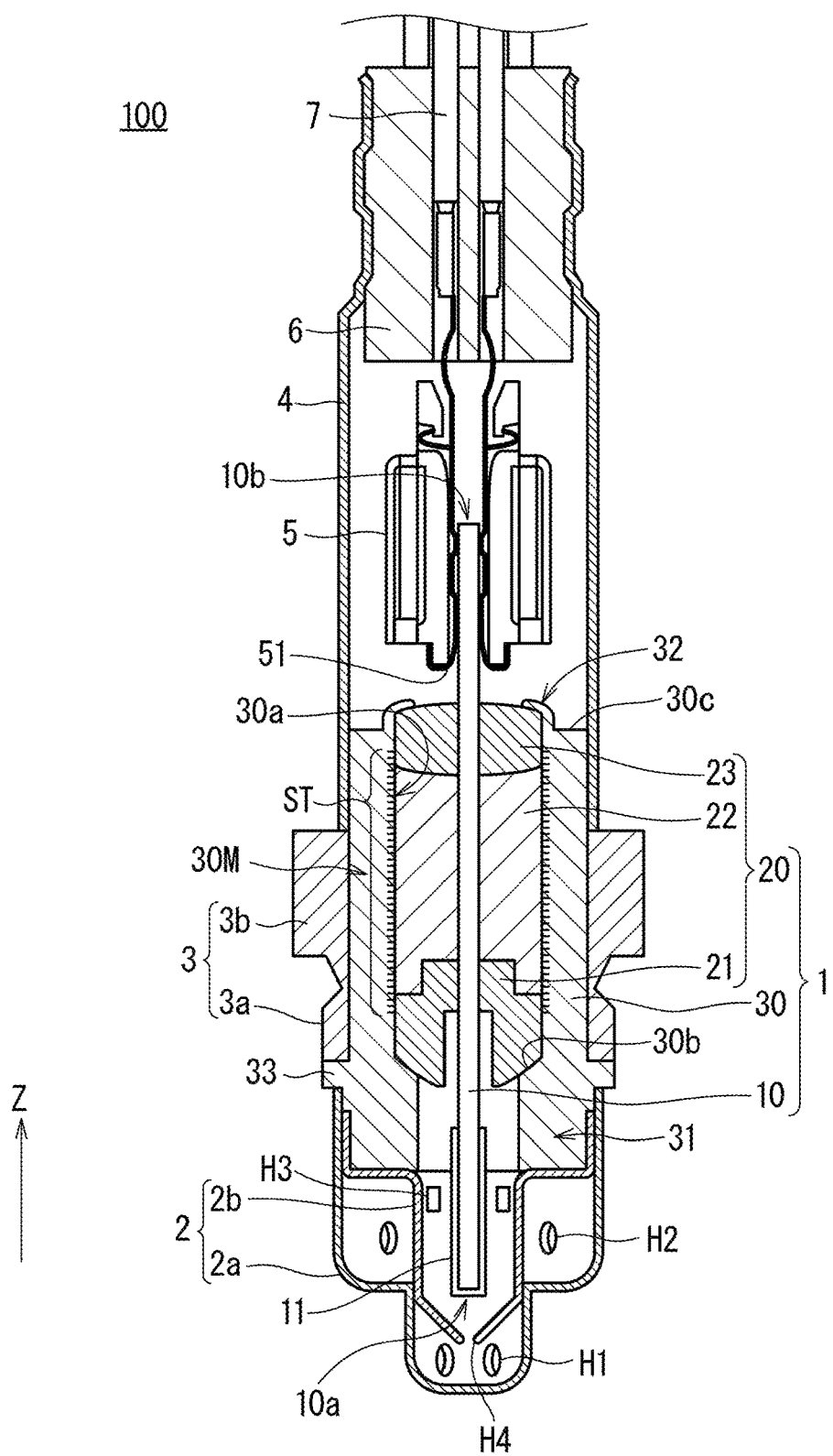
FIG. 1 is a main-part cross-sectional diagram taken along the longitudinal direction of a gas sensor 100.

FIG. 1 is a main-part cross-sectional diagram taken along the longitudinal direction of a gas sensor 100 (more specifically, a main body part thereof) being a target of assembly according to an embodiment of the present invention. In the present embodiment, the gas sensor 100 is configured to detect a predetermined gas component (for example, NOx or the like) by using a sensor element 10 provided in the gas sensor 100. Note that, in FIG. 1, the vertical direction is represented as the z-axis direction, and the longitudinal direction of the gas sensor 100 matches the z-axis direction (the same holds true in subsequent figures as well).

The gas sensor 100 mainly has a configuration in which an element sealing body (assembly) 1, which includes a sensor element 10, annularly-mounted components 20 that are annularly mounted around the sensor element 10, and a tubular body 30 that is further annularly mounted around the annularly-mounted components 20 and that accommodates the annularly-mounted components 20, is covered by a protective cover 2, a fixing bolt 3, and an outer cylinder 4. In other words, generally, the element sealing body 1 has a configuration in which the sensor element 10 penetrates in an axial direction at an axial center position inside the tubular body 30, and the annularly-mounted components 20 are annularly mounted to the sensor element 10 inside the tubular body 30.

The sensor element 10 is an elongated columnar or thin plate-like member with its main constituent material being an element body made of oxygen-ion conductive solid electrolyte ceramics such as zirconia. The sensor element 10 is disposed on a center axis along the longitudinal direction of the tubular body 30. The extending direction of the center axis matching the longitudinal direction of the tubular body 30 is hereinafter also referred to as an axial direction. In FIG. 1 and subsequent figures, the axial direction matches the z-axis direction.

The sensor element 10 has a configuration of including a gas inlet, an internal space, and the like on a side of a first tip end portion 10a, and including various electrodes and a wiring pattern on a surface of or inside the element body. In the sensor element 10, oxygen ion is generated when a test gas introduced into the internal space is reduced or decomposed in the internal space. In the gas sensor 100, concentration of a gas component is obtained based on the fact that the amount of oxygen ion flowing inside the element is proportional to the concentration of the gas component in a test gas.

A predetermined range on a surface of the sensor element 10 in the longitudinal direction from the first tip end portion 10a is covered by a protective film 11. The protective film 11 is provided in order to protect the vicinity of the first tip end portion 10a of the sensor element 10, where the internal space, the electrodes, and the like are provided, from thermal shock caused by wetting and the like, and is thus also referred to as a thermal-shock-resistant protective layer. The protective film 11 is, for example, a porous film being made of $Al_2O_3$ or the like and having a thickness of approximately 10 μm to 2000 μm. It is preferable that the protective film 11 be formed so as to be capable of withstanding a force of up to approximately 50 N, in the light of its purpose. Note that the formation range of the protective film 11 in FIG. 1 and each of the subsequent figures is merely an example, and an actual formation range is determined as appropriate according to a specific structure of the sensor element 10.

The protective cover 2 is a substantially cylindrical exterior member that protects the first tip end portion 10a of the sensor element 10, which is a part to come into direct contact with the target gas during use. The protective cover 2 is fixed to an outer peripheral end portion (outer periphery of a small diameter part 31 to be described later) of the tubular body 30 on a lower side as seen in the figure (negative side in the z-axis direction) through welding.

In the case illustrated in FIG. 1, the protective cover 2 has a double-layered structure including an outer cover 2a and an inner cover 2b. The outer cover 2a and the inner cover 2b are respectively provided with a plurality of through holes H1 and H2 and H3 and H4 that allow a gas to pass therethrough. Note that the type, the disposed number, the disposition position, the shape, and the like of the through holes illustrated in FIG. 1 are merely an example, and may be determined as appropriate by taking an in-flow manner of measurement gas into the protective cover 2 into consideration.

The fixing bolt 3 is an annular member that is used to fix the gas sensor 100 to a measurement position. The fixing bolt 3 includes a threaded bolt portion 3a and a holding portion 3b to be held when the bolt portion 3a is screwed. The bolt portion 3a is to be screwed with a nut provided at a position at an attachment position of the gas sensor 100. For example, the bolt portion 3a is screwed with a nut portion provided in the car exhaust pipe, which causes the gas sensor 100 to be fixed to the exhaust pipe in such a manner that the protective cover 2 side of the gas sensor 100 is exposed in the exhaust pipe.

The outer cylinder 4 is a cylindrical member in which one end portion thereof (a lower end portion as seen in the figure) is fixed to an outer peripheral end portion of the tubular body 30 on an upper side as seen in the figure (positive side in the z-axis direction) through welding. A connector 5 is disposed inside the outer cylinder 4. Further, a rubber grommet 6 is annularly mounted to another end portion (upper end portion as seen in the figure) of the outer cylinder 4.

The connector 5 includes a plurality of contact members 51 that come into contact with a plurality of terminal electrodes included in a second tip end portion 10b of the sensor element 10. Each contact member 51 is connected with a lead line 7 that is inserted into the grommet 6. The lead lines 7 are connected to a controller and various power supplies (not shown) outside of the gas sensor 100.

Note that, although FIG. 1 illustrates only two contact members 51 and lead lines 7, these are merely some examples.

The tubular body 30 is a metal tubular member also referred to as a main metal fitting. In the tubular body 30, the sensor element 10 and the annularly-mounted components 20 are accommodated. In other words, the tubular body 30 is further annularly mounted around the annularly-mounted components 20 that are annularly mounted around the sensor element 10.

The tubular body 30 mainly includes a thick main part 30M having a cylindrical inner surface (inner peripheral surface) 30a in parallel with the axial direction, which forms a cylindrical internal space (through hole) 30h (see FIG. 3A and FIG. 3B), a diameter-reduced part 31 thicker than the main part 30M that is provided at a lower end portion in the axial direction as seen in the figure (negative side in the z-axis direction), a thin crimp part 32 that extends further upwardly from an end surface 30c of the main part 30M positioned at an upper end in the axial direction as seen in the figure and that is bent in a direction toward the axial center, and a locking part 33 that projects outwardly in the circumferential direction.

The diameter of the internal space 30h in cross-section perpendicular to the axial direction (inner diameter of the main part 30M) is set to approximately 8.8 mm to 9.2 mm.

Further, a predetermined range of an inner surface 30a is formed into a stripe region ST. The details of the stripe region ST will be described later.

In the diameter-reduced part 31, the diameter of the internal space 30h is reduced through a tapered surface 30b having tapered a shape in cross-section being inclined with respect to the inner surface 30a.

With the crimp part 32 being bent, any of the internally disposed annularly-mounted component 20 (directly, a second ceramics supporter 23) is pressed and fixed (constrained) from the upper side as seen in the figure. Note that, as will be described later, the crimp part 32 is bent after annularly mounting to the sensor element 10 and the annularly-mounted components 20.

The annularly-mounted components 20 are a first ceramics supporter 21, a powder compact 22, and a second ceramics supporter 23.

The first ceramics supporter 21 and the second ceramics supporter 23 are each an insulator made of ceramics. More specifically, a rectangular through hole (not shown) according to the cross-sectional shape of the sensor element 10 is provided at an axial center position of the first ceramics supporter 21 and the second ceramics supporter 23, and the sensor element 10 is inserted into the through hole, thereby to have the first ceramics supporter 21 and the second ceramics supporter 23 annularly mounted to the sensor element 10. Note that the first ceramics supporter 21 is locked onto the tapered surface 30b of the tubular body 30 on the lower side as seen in the figure.

In contrast, the powder compact 22 is obtained by such a way that two molded bodies 22a and 22b (see FIG. 3A and FIG. 3B) that have been by molding ceramics powder such as talc and annularly mounted to the sensor element 10 with the sensor element 10 inserted into a through hole, similarly to the first ceramics supporter 21 and the second ceramics supporter 23, are disposed inside the tubular body 30 while annularly mounted around the sensor element 10, and are then further compressed to be integral with each other. More specifically, ceramics particles constituting the powder compact 22 are densely filled in the space enclosed in the stripe region ST of the tubular body 30 between the first ceramics supporter 21 and the second ceramics supporter 23, through which the sensor element 10 penetrates.

Note that using the two molded bodies 22a and 22b is not necessarily required, and a single molded body may be used. Alternatively, a separate ceramics supporter or molded body may be interposed between the two molded bodies 22a and 22b.

In the element sealing body 1, generally, fixing of the sensor element 10 and the annularly-mounted components 20 inside the tubular body 30 is implemented through locking performed by the tapered surface 30b of the first ceramics supporter 21 and pressing performed by the crimp part 32 from the upper side as seen in the figure of the second ceramics supporter 23. In addition, airtight sealing between the first tip end portion 10a side and the second tip end portion 10b side of the sensor element 10 is implemented through compression filling of the powder compact 22.

<Stripe Region of Tubular Body Inner Surface>

Figure 2:
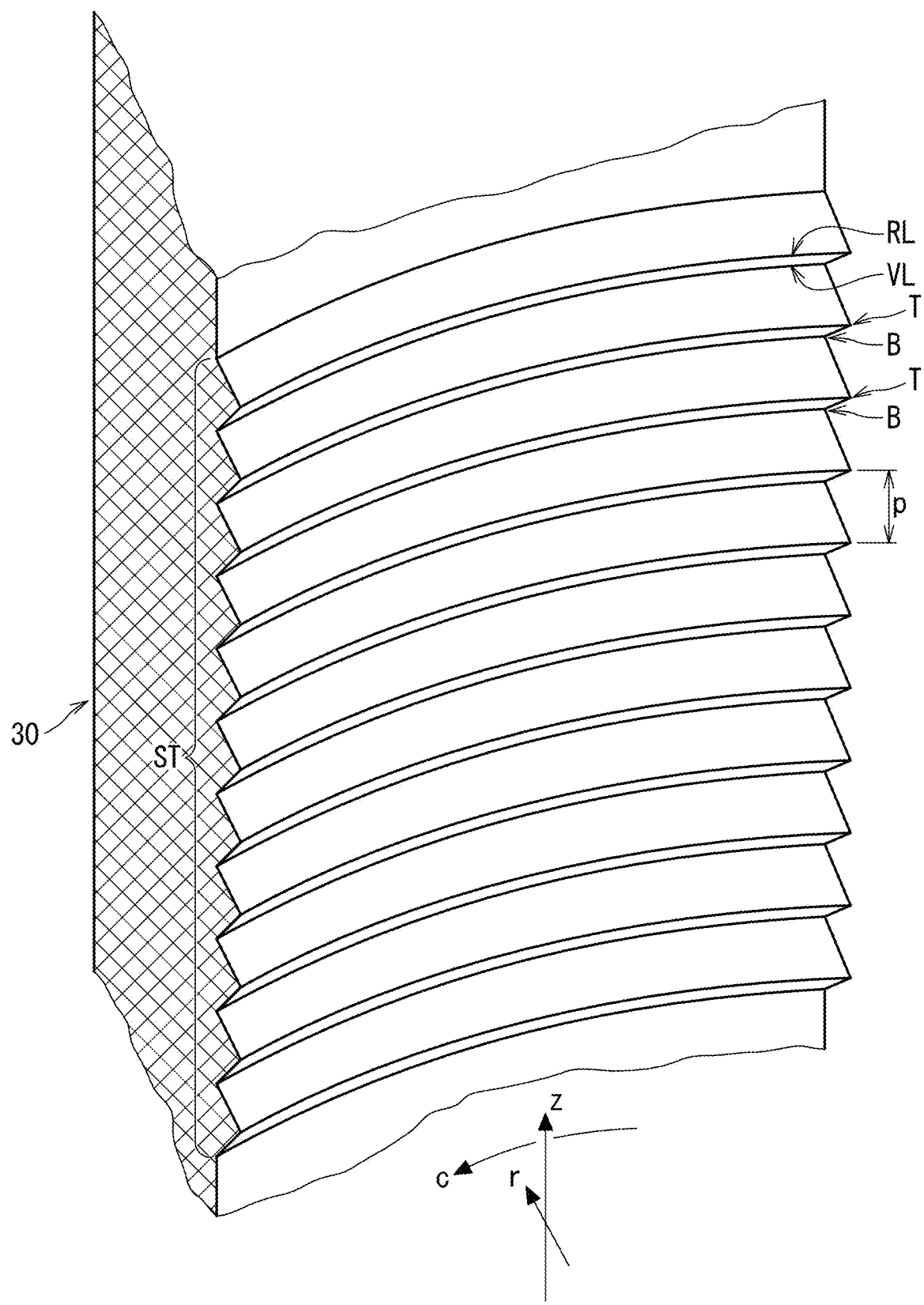
FIG. 2 is a partial enlarged view near an inner surface 30a of a tubular body 30 for schematically illustrating a state of a stripe region ST.

Next, the stripe region ST provided in the inner surface 30a of the tubular body 30 will be more specifically described. FIG. 2 is a partial enlarged view near the inner surface 30a of the tubular body 30 for schematically illustrating a state of the stripe region ST. Note that, in FIG. 2, similarly to FIG. 1, the axial direction of the tubular body 30 is represented as the z-axis direction, the inner circumferential direction of the inner surface 30a (direction along the circumference of the inner surface 30a in cross-section perpendicular to the axial direction) is represented as a c axial direction, and the radial direction (direction along the radius of the inner surface 30a in cross-section perpendicular to the axial direction) is represented as an r axial direction.

In the gas sensor 100 according to the present embodiment, the stripe region ST corresponds to a recessed and projecting region that is provided at least in a range of the inner surface 30a of the tubular body 30 to come into contact with the powder compact 22, in which projecting portions T and recessed portions B are alternately arranged in the axial direction of the tubular body 30 and the projecting portions T and the recessed portions B extend along the inner circumferential direction of the tubular body 30, Note that, in the present embodiment, in a surface perpendicular to the axial center of the tubular body 30, a direction from the outside toward the axial center is defined to be a direction of the projection, and a direction opposite to the direction is defined to be a direction of the recess.

More specifically, in the stripe region ST, ridge lines (mountain lines) RL formed by the projecting portions T and valley lines VL formed by the recessed portions B extend along the inner circumferential direction of the tubular body 30. Note that, in FIG. 2, the ridge lines RL and the valley lines VL form edges, but this is for the sake of simplicity of illustration. In the actual stripe region ST, the projecting portions T and the recessed portions B may together form curved surfaces having a predetermined curvature radius.

Further, an interval p between the ridge lines RL (between the projecting portions T) in the axial direction is 50 µm or more and 150 µm or less. This value is sufficiently smaller than the above-described inner diameter of the main part 30M, which is also the diameter of the inner surface 30a in cross-section perpendicular to the axial direction. Note that, in FIG. 2, for the sake of convenience of illustration, the recesses and the projections are exaggerated than the actual case.

In addition, the stripe region ST is formed so as to satisfy expression (1) and expression (2) below, where a maximum recess and projection difference as observed when the stripe region ST is seen along the axial direction, that is, a maximum height Rz (JIS B 0601) in any cross-section in the axial direction, is represented as a first maximum height Rz1, and a maximum recess and projection difference as observed when the stripe region ST is seen along the inner circumferential direction, that is, a maximum height Rz (ditto) in any cross-section perpendicular to the axial direction, is represented as a second maximum height Rz2.

$$0.3 \ \mu m \leq Rz1 \leq 10 \ \mu m \tag{1}$$

$$Rz1/Rz2 \geq 2.0 \tag{2}$$

Note that the maximum height Rz can be, for example, evaluated using a contact needle-type surface roughness measurement apparatus.

In the element sealing body 1 of the gas sensor 100 according to the present embodiment, the stripe region ST having a configuration as described above is provided at least in a range of the inner surface 30a of the tubular body 30 to come into contact with the powder compact 22. In the stripe region ST, the configuration allows for implementation of a state in which the ceramics particles constituting the powder compact 22 are densely filled along the recessed portions B extending along the inner circumferential direction of the tubular body 30 and a contact area between the inner surface 30a and the ceramics particles is sufficiently secured. From another point of view, it can also be said that the projecting portions T extending along the inner circumferential direction of the tubular body 30 enter the powder compact 22 in a wedged manner. Further, owing to the repeated presence of the projecting portions T in the axial direction at the intervals p, a leak path along the axial direction between the tubular body 30 and the powder compact 22 is less liable to be formed.

As a result, in the element sealing body 1 of the gas sensor 100 according to the present embodiment, satisfactory airtightness is secured even when a sealing load at the time of filling the powder compact 22 is decreased than that of the related art. Alternatively, it can be considered that, by performing sealing with a sealing load approximately as much as that of the related art, the element sealing body 1 further excellent in airtightness than that of the related art can be obtained.

The stripe region ST of the tubular body 30 producing such effects can be obtained by, for example, first obtaining a general shape of the tubular body 30 through forging of metal as a raw material, and then performing machining, polishing, and the like on the inner surface 30a of the main part 30M.

For example, in the inner surface 30a of the tubular body 30 after forging, usually, there is a tendency that remarkable recesses and projections are liable to be generated along the inner circumferential direction, that is, projecting portions and recessed portions along the axial direction are liable to be formed. In such a case, machining, polishing, and the like are performed along the inner circumferential direction so as to resolve such recesses and projections, which results in successfully producing the stripe region ST as illustrated in FIG. 2.

Incidentally, "the projecting portions T and the recessed portions B extend along the inner circumferential direction of the tubular body 30" means that both of the ridge lines RL and the valley lines VL sufficiently are substantially in parallel with the inner circumferential direction of the inner surface 30a. Here, "being substantially in parallel" means that, as well as its original meaning of exact parallelism, such slight inclination that cannot be necessarily easily resolved in the light of the method of forming the stripe region ST and that can be tolerated in the light of the effects of securing airtightness with a low sealing load described above is permitted. As a matter of course, when an inclination is intentionally provided, this does not fall under "substantial parallelism".

For example, assume that the inner diameter of the main part 30M is 9 mm. In this case, even when the interval p between the ridge lines RL is set to 45 μm, and the position of the ridge line RL at the both ends in the cross-section including the axial center of the inner surface 30a in the axial direction is shifted by as much as 90 μm in the axial direction, which is a double of the interval p, the inclination angle of the ridge lines RL in this case is merely arc tan(0.09/9)=approximately 0.57°.

In practical use, when the inclination angle of the ridge line RL is approximately 28° or less, or when the ratio of the interval p to the inner diameter of the main part 30M is 0.83 or less, it can be regarded with no problem that the projecting portions T and the recessed portions B extend along the inner circumferential direction of the tubular body 30.

Further, in FIG. 1, only a partial range of the inner surface 30a of the main part 30M is set as the stripe region ST. However, the entire inner surface 30a may be subjected to treatment as the stripe region ST.

<Assembly of Element Sealing Body>

Lastly, an outline of a procedure of assembly of the element sealing body 1 will be described. FIG. 3A, FIG. 3B, FIG. 4A, FIG. 4B, FIG. 5A, and FIG. 5B are each a cross-sectional diagram taken along the z-axis direction for illustrating a state in the middle of assembly of the element sealing body 1. Note that, in FIG. 3A, FIG. 3B, FIG. 4A, FIG. 4B, FIG. 5A, and FIG. 5B, illustration of the protective cover 2 is merely schematic.

Figure 3A:
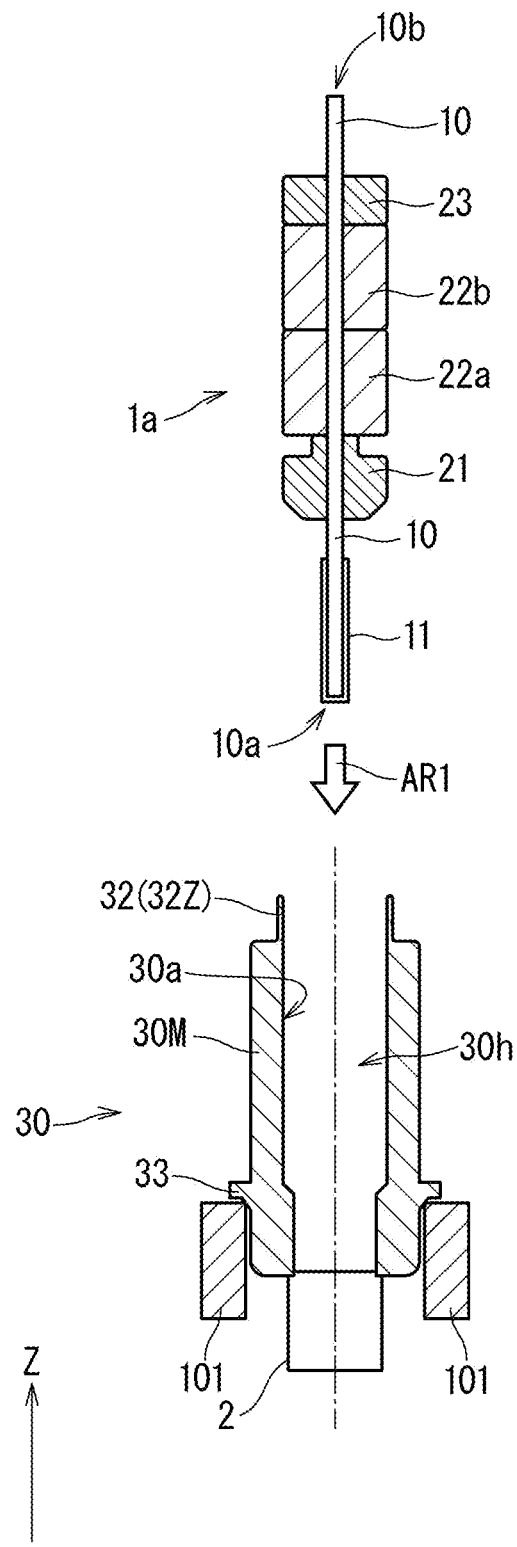
FIG. 3A and FIG. 3B are each a cross-sectional diagram taken along the z-axis direction for illustrating a state in the middle of assembly of an element sealing body 1.

First, an annular mounting body 1a, in which the first ceramics supporter 21, the two molded bodies 22a and 22b, and the second ceramics supporter 23 are sequentially annularly mounted to the sensor element 10, as illustrated in FIG. 3A, is prepared in advance. In other words, in the annular mounting body 1a, each component is annularly mounted so that the first ceramics supporter 21 and the second ceramics supporter 23 are located at both the ends.

More specifically, in the annular mounting body 1a, a rectangular through hole (not shown) provided in each of the first ceramics supporter 21, the molded bodies 22a and 22b, and the second ceramics supporter 23 is fitted to the sensor element 10, in such a manner that each component is annularly mounted to the sensor element 10. A publicly known technology is applied to the formation of the annular mounting body 1a as appropriate. Preferably, annular mounting is performed in a manner in which the protective film 11 provided on the first tip end portion 10a side does not come into contact with the through hole of each component to be annularly mounted.

Then, by inserting the prepared annular mounting body 1a into the tubular body 30 as indicated by the arrow AR1, the tubular body 30 is annularly mounted to the annular mounting body 1a. Note that, as illustrated in FIG. 3A, the crimp part 32 is not bent at this time point, and is present as a thin cylindrical extending portion 32Z that extends vertically upwardly (positive direction in the z-axis) from the end surface 30c. In this case, the inner surface of the extending portion 32Z continues to the cylindrical inner surface 30a in the axial direction that forms the internal space 30h in the tubular body 30 (or in the main part 30M). Therefore, the inner surface 30a including the inner surface of the extending portion 32Z is also hereinafter referred to as the inner surface 30a.

Further, prior to annular mounting to the annular mounting body 1a, the stripe region ST is formed in advance in a range of the tubular body 30 similarly to at least FIG. 1.

Figure 3B:
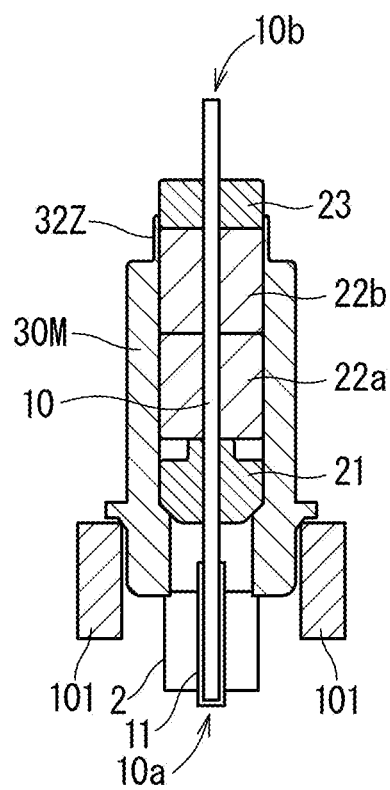

FIG. 3A illustrates an example of a case in which the annular mounting body 1a is inserted from the vertically upper side, with a posture that the first tip end portion 10a faces downward, into the tubular body 30 that is fixed in a manner that the extending portion 32Z side faces upward and the axial direction matches the vertical direction (z-axis direction), by such a way that the locking part 33 is supported from below with a predetermined tubular body support means 101. The insertion allows for implementation of a state as illustrated in FIG. 3B in which the sensor element 10 penetrates in the axial direction at the axial center position of the tubular body 30 and the annularly-mounted components 20 are accommodated in the internal space 30h of the tubular body 30. In this case, the annularly-mounted components 20 are locked onto the tapered surface 30b at the deepest part of the internal space 30h, whereas the first tip end portion 10a of the sensor element 10 penetrates to the outside of the tubular body 30 through the diameter-reduced part 31. The second tip end portion 10b originally projects from the annularly-mounted components 20.

Note that, instead of the aspect illustrated in FIG. 3A, both of the annular mounting body 1a and the tubular body 30 may be in vertically inverted postures, and the tubular body 30 is annularly-mounted from the vertically upper side with respect to the annular mounting body 1a.

As illustrated in FIG. 3B, at the time point when the annular mounting body 1a is inserted, the molded bodies 22a and 22b are separately present, and further, as indicated by the closed curve line E1, the second ceramics supporter 23 projects from the extending portion 32Z.

Figure 4A:
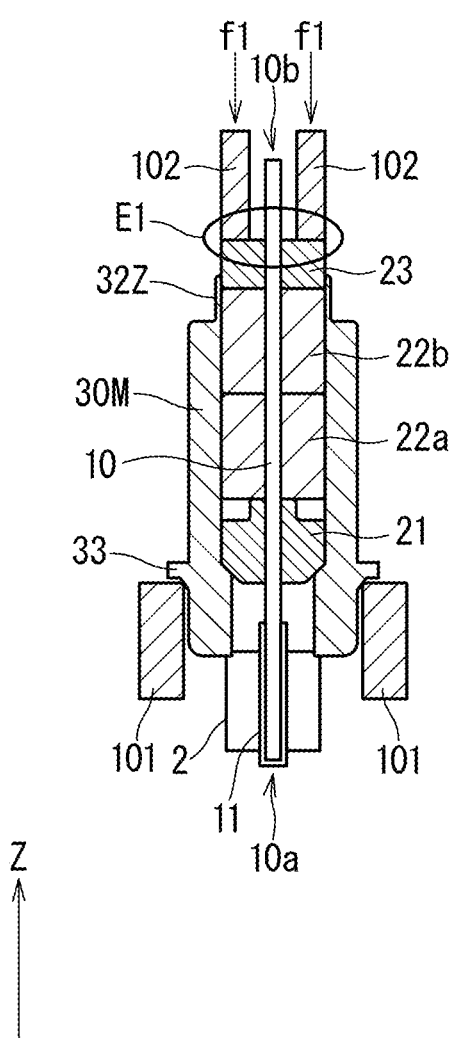
FIG. 4A and FIG. 4B are each a cross-sectional diagram taken along the z-axis direction for illustrating a state in the middle of assembly of the element sealing body 1.

After the annular mounting body 1a is inserted into the tubular body 30, subsequently, as illustrated in FIG. 4A, a predetermined pressing means 102 is caused to come into abutment against an upper end of the second ceramics supporter 23 that is located at the uppermost position in the annular mounting body 1a and that projects from the extending portion 32Z, and is further lowered. Due to the lowering of the pressing means 102, the second ceramics supporter 23 is pressed vertically downwardly (negative direction in the z-axis) with a predetermined load f1. The compression with the load f1 is referred to as provisional compression (primary compression).

Figure 4B:
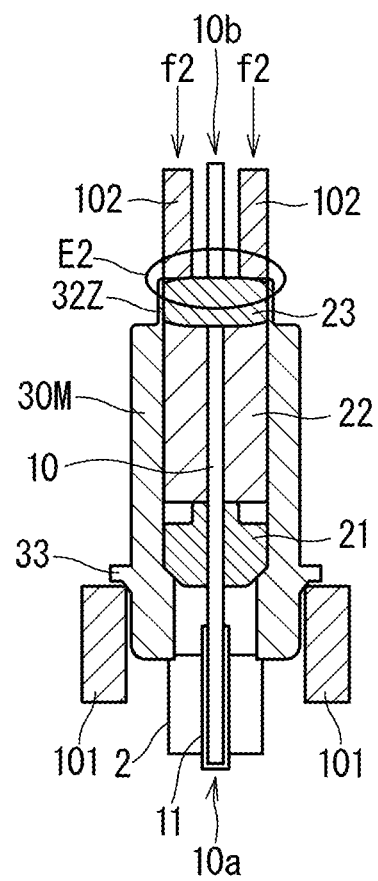

As a results of the provisional compression, the two molded bodies 22a and 22b immediately below the second ceramics supporter 23 are compressed through the second ceramics supporter 23, so as to become one powder compact 22 as illustrated in FIG. 4B. In that case, the ceramics particles of the powder compact 22 are pressed into the recessed portions B of the stripe region ST. Further, as indicated by the closed curve line E2, the second ceramics supporter 23 is lowered as compared to before the pressing. Further, owing to the provisional compression, the sensor element 10 is disposed in a preset predetermined disposition range.

It is preferable that the load f1 be applied in a range of approximately 3.0 MPa to 6.6 MPa in a pressure value. For example, when the diameter of the main part 30M of the tubular body 30 is approximately 8.8 mm to 9.2 mm as described above, it is preferable that the load f1 be applied in a range of approximately 0.2 kN to 0.4 kN.

After the provisional compression as described above is performed, as illustrated in FIG. 4B, the pressing means 102 is caused to come into abutment against the upper end of the second ceramics supporter 23 again, and is further lowered. A load f2 to be applied to the second ceramics supporter 23 by the pressing means 102 is usually set to a value larger than the load f1 in the provisional compression. The compression with the load f2 is referred to as main compression (secondary compression).

Figure 5A:
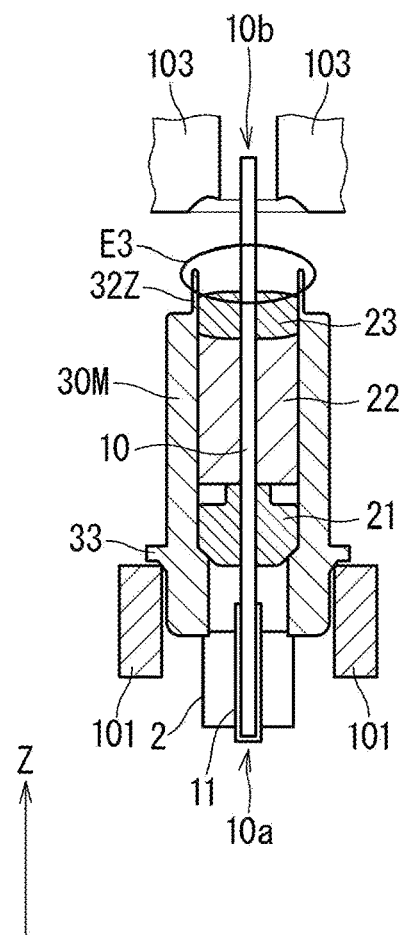
FIG. 5A and FIG. 5B are each a cross-sectional diagram taken along the z-axis direction for illustrating a state in the middle of assembly of the element sealing body 1.

As indicated by the closed curve line E3 in FIG. 5A, after the main compression, the upper end of the second ceramics supporter 23 is lowered downwardly from the tip end of the extending portion 32Z of the tubular body 30 by a predetermined distance (hereinafter a crimping height) h.

Owing to the main compression, the one powder compact 22 is further compressed through the second ceramics supporter 23. With this, the ceramics particles of the powder compact 22 are sufficiently filled into the recessed portions B of the stripe region ST. In this manner, the sensor element 10 is completely fixed, and the first tip end portion 10a side and the second tip end portion 10b side of the sensor element 10 are airtightly sealed.

Note that, due to the main compression, the sensor element 10 may be slightly shifted from the position disposed in the provisional compression. However, by setting the disposition position of the sensor element 10 at the time of the provisional compression with the position at the time of the main compression being taken into account, the fixing position of the sensor element 10 after the main compression falls within a preset tolerance range.

Note that it is preferable that the load f2 be applied in a range of approximately 75 MPa to 115 MPa in a pressure value. For example, when the inner diameter of the main part 30M of the tubular body 30 is approximately 8.8 mm to 9.2 mm as described above, it is preferable that the load f2 be applied in a range of approximately 5 kN to 7 kN. Therefore, as low as 5 kN (more than 500 kgf) is sufficient enough. It can be said that this is a sufficiently low value in view of the fact that the sealing load in the main compression when the element sealing body 1 is produced by using the tubular body 30 that has a similar inner diameter but does not have the stripe region ST (of the related art) is set to approximately 800 kN to 2000 kN.

Further, adopting such a small sealing load is preferable also from the perspective of reduction of shift from the axial center position due to application of an excessive force to the sensor element 10 at the time of the main compression as well as the risk of damage.

After the main compression is performed, subsequently, crimping treatment of bending the extending portion 32Z of the tubular body 30 in the axial center direction is performed, so as to form the crimp part 32.

The crimping treatment is, generally, performed by lowering a metal crimping jig (bending means) 103 disposed above the extending portion 32Z so as to come into abutment against the extending portion 32Z.

Figure 5B:
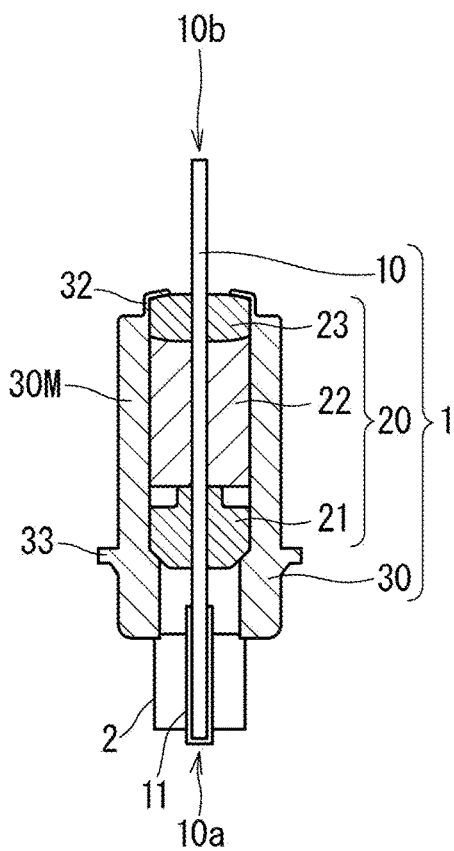

Through execution of the crimping treatment, as illustrated in FIG. 5B, the extending portion 32Z is bent, and the crimp part 32 is formed. The crimp part 32 is provided so as to come into abutment against the second ceramics supporter 23.

With the completion of the crimping treatment, fixing between the sensor element 10 and the annularly-mounted components 20 inside the tubular body 30 is implemented. In this manner, the element sealing body 1 is obtained.

Note that, when the extending portion 32Z is bent through the crimping treatment, in order to prevent the second ceramics supporter 23 from being damaged due to the extending portion 32Z coming into contact with the second ceramics supporter 23, the crimping treatment may be performed after a washer being a metal annular thin plate is disposed on the second ceramics supporter 23.

As has been described in the above, according to the present embodiment, in the element sealing body of the gas sensor in which the sensor element is fixed and airtight sealing between both the end portions of the sensor element is implemented, the stripe region is provided in the tubular body in which the sensor element is caused to penetrate and the annularly-mounted components that are annularly mounted around the sensor element are accommodated, at least in a range to come into contact with the powder compact being one of the annularly-mounted components, where the stripe region is the recessed and projecting region in which the projecting portions and the recessed portions are alternately arranged in the axial direction and the projecting portions and the recessed portions extend along the inner circumferential direction of the tubular body. Consequently, satisfactory airtightness can be secured with a sealing load smaller than that of the related art. With this configuration, the risks of shift of the position or the orientation of the sensor element at the time of sealing and damage of the sensor element can be reduced. Alternatively, it can be considered possible that, by performing sealing with a sealing load approximately as much as that of the related art, the element sealing body further excellent in airtightness than that of the related art can be obtained.

Example

Four types of element sealing bodies 1 (samples No. 1 to No. 4) were produced, and evaluation of airtightness was performed for each of the element sealing bodies 1. Note that the tubular body 30 of each of the element sealing bodies 1 was obtained by performing forging under the same condition so that the inner diameter of the main part 30M was 9 mm, and then using different machining conditions at the time of forming the stripe region ST as appropriate. Further, the sealing load at the time of the main compression (secondary compression) was set to 4.98 kN (=approximately 508 kgf).

The first maximum height Rz1, the second maximum height Rz2, and the ratio Rz1/Rz2 of each of the samples are shown in table 1. Note that, for evaluation of the maximum height, a contact needle-type surface roughness measurement apparatus was used, and a measurement range in the axial direction was set to 13 mm, and a measurement range in the circumferential direction was set to 2 mm. Further, in any of the cases, the first maximum height Rz1 and the second maximum height Rz2 were obtained after removing (cutting off) a periodical component having a wavelength of less than 2.5 μm or more than 0.8 mm from the curve line in cross-section obtained through the measurement.

TABLE 1

| No. | Rz1(μm) | Rz2 (μm) | Rz1/Rz2 |
|---|---|---|---|
| 1 | 0.45 | 0.18 | 2.50 |
| 2 | 0.98 | 0.18 | 5.42 |
| 3 | 5.85 | 0.22 | 26.74 |
| 4 | 8.57 | 0.23 | 37.90 |

As shown in table 1, in each of the samples, the second maximum height Rz2 in the stripe region ST of the tubular body 30 was substantially similar to each other. However, there was a difference in the first maximum height Rz1, hence generating a difference in the ratio Rz1/Rz2 as well. Note that, in any of the samples, expressions (1) and (2) described above were satisfied.

For evaluation of airtightness, an evaluation method the same as that of the airtightness test disclosed in Japanese Patent No. 6317145 was adopted. Thus, detailed description of the test will be herein omitted. Note that, in order that evaluation can be performed under the same condition as the condition disclosed in Japanese Patent No. 6317145, additional assembly of necessary components or the like was performed as appropriate.

Figure 6:
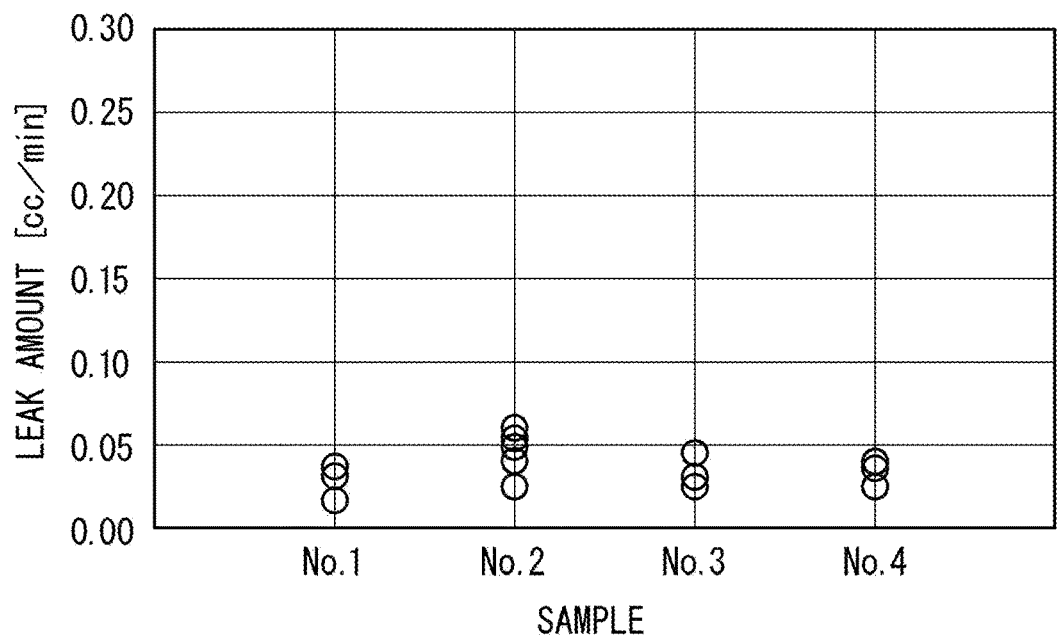
FIG. 6 is a diagram showing a leak amount in each sample measured in an airtightness test.

The airtightness test was performed five times for each sample. FIG. 6 is a diagram showing a leak amount in each sample measured in the airtightness test.

From FIG. 6, it can be seen that the leak amount falls within a range of approximately 0.2 to 0.5 cc/mm regardless of the value of the ratio Rz1/Rz2. These values are compared to the results of the airtightness test in the working example of Japanese Patent No. 6317145, which was performed on a plurality of element sealing bodies with the (present) sealing load being different in a range of 800 kgf to 2000 kgf. The comparison leads to a confirmation that there is a tendency that the leak amount in samples No. 1 to No. 4 is substantially approximate to that of the element sealing body according to Japanese Patent No. 6317145 whose sealing load is a maximum of 2000 kgf in the above range, and is smaller than the leak amount in the element sealing body according to Japanese Patent No. 6317145 whose sealing load is set to 800 kgf to 1400 kgf which is smaller than the above case.

In view of the fact that the sealing load onto samples No. 1 to No. 4 is 500 kgf, the results of the present example show that, by adopting the configuration of the element sealing body 1 according to the embodiment described above, airtightness as high as that of a product of the related art can be obtained, even when the sealing load is reduced smaller than that of the related art.

Further, in the working example disclosed in Japanese Patent No. 6317145, there is a tendency that the leak amount is further reduced as the value of the sealing load is larger in the above range. Provided that a similar tendency is also obtained in the embodiment described above, it can also be said that the results shown in FIG. 6 suggest that the leak amount can be further reduced when sealing is performed with the sealing load that is similar to that of the working example according to Japanese Patent No. 6317145. Specifically, it can also be said that the results suggest that an element sealing body further excellent in airtightness than that of the related art can be obtained.

While the invention has been shown and described in detail, the foregoing description is in all aspects illustrative and not restrictive. It is therefore understood that numerous modifications and variations can be devised without departing from the scope of the invention.

What is claimed is:
1. A gas sensor comprising:
a sensor element;
a tubular body including a through hole allowing the sensor element to penetrate an inside of the tubular body in an axial direction, the tubular body being made of metal; and
a powder compact being filled between an inner surface of the tubular body constituting the through hole and the sensor element, and sealing between a first end portion side and a second end portion side of the sensor element, wherein at least a range of the inner surface of the tubular body to come into contact with the powder compact is a stripe-like recessed and projecting region in which projecting portions and recessed portions are alternately arranged in the axial direction and the projecting portions and the recessed portions extend along an inner circumferential direction of the tubular body, an interval between the projecting portions in the axial direction is 50 µm or more and 150 µm or less, and a first maximum height Rz1 being a maximum height in the axial direction and a second maximum height Rz2 being a maximum height in the inner circumferential direction of the stripe-like recessed and projecting region satisfy the following expressions:

$0.3 \ \mu m \leq Rz1 \leq 10 \ \mu m$, and $Rz1/Rz2 \geq 2.0$.

2. The gas sensor according to claim 1, wherein the powder compact includes ceramics particles having an average particle diameter of 50 µm to 550 µm.

3. The gas sensor according to claim 2, wherein the powder compact is filled between a first ceramics supporter and a second ceramics supporter inside the tubular body, each of the first ceramics supporter and the second ceramics supporter being annularly mounted to the sensor element.

4. The gas sensor according to claim 1, wherein the powder compact is filled between a first ceramics supporter and a second ceramics supporter inside the tubular body, each of the first ceramics supporter and the second ceramics supporter being annularly mounted to the sensor element.

5. An element sealing body, of a gas sensor including a sensor element made of ceramics, fixes the sensor element and seals between a first end portion side and a second end portion side of the sensor element, the element sealing body comprising:

the sensor element;

a tubular body including a through hole allowing the sensor element to penetrate an inside of the tubular body in an axial direction, the tubular body being made of metal; and a powder compact being filled between an inner surface of the tubular body constituting the through hole and the sensor element, and sealing between the first end portion side and the second end portion side of the sensor element, wherein at least a range of the inner surface of the tubular body to come into contact with the powder compact is a stripe-like recessed and projecting region in which projecting portions and recessed portions are alternately arranged in the axial direction and the projecting portions and the recessed portions extend along an inner circumferential direction of the tubular body, an interval between the projecting portions in the axial direction is 50 µm or more and 150 µm or less, and a first maximum height Rz1 being a maximum height in the axial direction and a second maximum height Rz2 being a maximum height in the inner circumferential direction of the stripe-like recessed and projecting region satisfy the following expressions:

$0.3 \ \mu m \leq Rz1 \leq 10 \ \mu m$, and $Rz1/Rz2 \geq 2.0$.

6. The element sealing body of the gas sensor according to claim 5, wherein the powder compact includes ceramics particles having an average particle diameter of 50 µm to 550 µm.

7. The element sealing body of the gas sensor according to claim 6, wherein the powder compact is filled between a first ceramics supporter and a second ceramics supporter inside the tubular body, each of the first ceramics supporter and the second ceramics supporter being annularly mounted to the sensor element.

8. The element sealing body of the gas sensor according to claim 5, wherein the powder compact is filled between a first ceramics supporter and a second ceramics supporter inside the tubular body, each of the first ceramics supporter and the second ceramics supporter being annularly mounted to the sensor element.

9. A tubular body, in a gas sensor including a sensor element made of ceramics, that is used for sealing between a first end portion side and a second end portion side of the sensor element by a powder compact made of ceramics particles, the tubular body comprising:

a cylindrical internal space; and a stripe-like recessed and projecting region in which projecting portions and recessed portions are alternately arranged in an axial direction of the tubular body and the projecting portions and the recessed portions extend along an inner circumferential direction of the tubular body, the stripe-like recessed and projecting region being provided in a range of an inner surface of the tubular body to come into contact with the powder compact at time of the sealing, wherein an interval between the projecting portions in the axial direction is 50 µm or more and 150 µm or less, and a first maximum height Rz1 being a maximum height in the axial direction and a second maximum height Rz2 being a maximum height in the inner circumferential direction of the stripe-like recessed and projecting region satisfy the following expressions:

$0.3 \ \mu m \leq Rz1 \leq 10 \ \mu m$, and $Rz1/Rz2 \geq 2.0$.

* * * * *